United States Patent [19]

Barnhill

[11] 4,273,991
[45] Jun. 16, 1981

[54] PRESSURE COOKER

[75] Inventor: Donald R. Barnhill, Hamilton, Ohio

[73] Assignee: B & W Metals Company, Inc., Fairfield, Ohio

[21] Appl. No.: 98,673

[22] Filed: Nov. 29, 1979

[51] Int. Cl.³ .............................................. F27D 11/02
[52] U.S. Cl. ..................... 219/440; 99/330; 99/333; 99/403; 99/408; 126/369; 219/431; 219/494; 426/436; 220/316
[58] Field of Search ............... 219/390, 431, 440, 494; 126/348, 369, 381, 383, 387; 99/330, 331, 333, 337, 403, 408; 426/438; 220/316

[56] References Cited

U.S. PATENT DOCUMENTS

| Re. 29,609 | 4/1978 | Wadia et al. | 219/494 |
|---|---|---|---|
| 1,931,120 | 10/1933 | Shroyer | 126/383 X |
| 2,194,118 | 3/1940 | Graham | 219/440 |
| 2,914,063 | 11/1959 | Wagner | 126/381 |
| 3,118,042 | 1/1964 | Parker | 219/406 |
| 3,170,060 | 2/1965 | Oliver, Jr. et al. | 219/390 |
| 3,280,722 | 10/1966 | Rahauser | 99/330 |
| 3,314,416 | 4/1967 | Wagner | 126/369 |
| 3,433,150 | 3/1969 | Fries | 99/403 |
| 3,610,133 | 10/1971 | Mies, Jr. et al. | 99/337 |
| 3,816,703 | 6/1974 | Binks | 219/440 |
| 3,824,373 | 7/1973 | Napier | 219/494 |
| 3,845,702 | 11/1974 | Mies | 99/408 |
| 3,853,044 | 12/1974 | Albright et al. | 99/330 |
| 3,877,359 | 4/1975 | Keating | 99/331 |
| 3,960,137 | 6/1976 | Schmid | 126/387 |
| 3,971,307 | 7/1976 | Graham | 99/403 |
| 3,973,481 | 8/1976 | Mies | 99/408 |
| 3,976,218 | 8/1976 | Stoermer | 220/316 |
| 3,998,146 | 12/1976 | Price | 99/403 |

Primary Examiner—Volodymyr Y. Mayewsky
Attorney, Agent, or Firm—Wood, Herron & Evans

[57] ABSTRACT

A pressure cooker particularly adapted for use as a pressure fryer. The cooker's tank is electrically heated by a novel electrical resistance heater and heat reflector structure. The cooker also includes a novel cover and cover hold-down mechanism.

3 Claims, 7 Drawing Figures

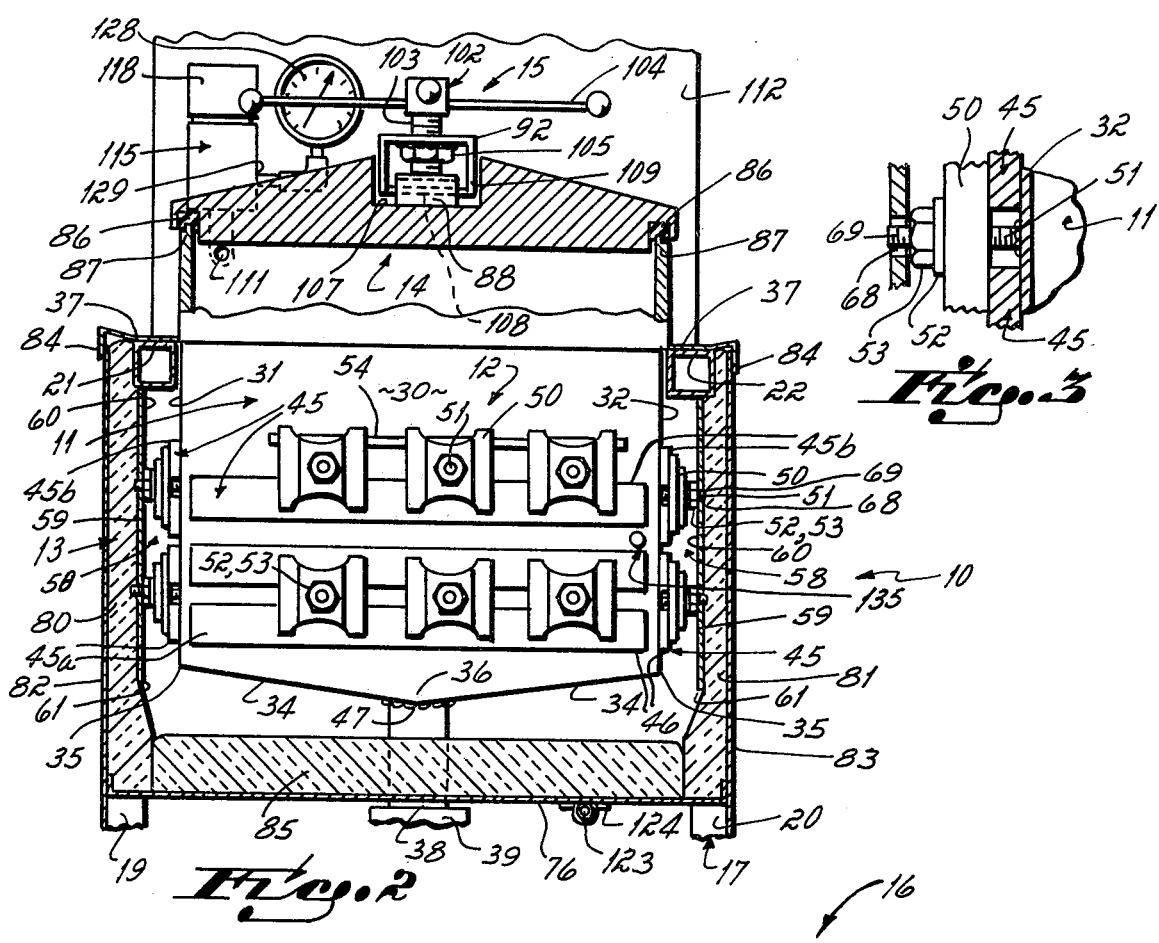
Fig. 2
Fig. 3
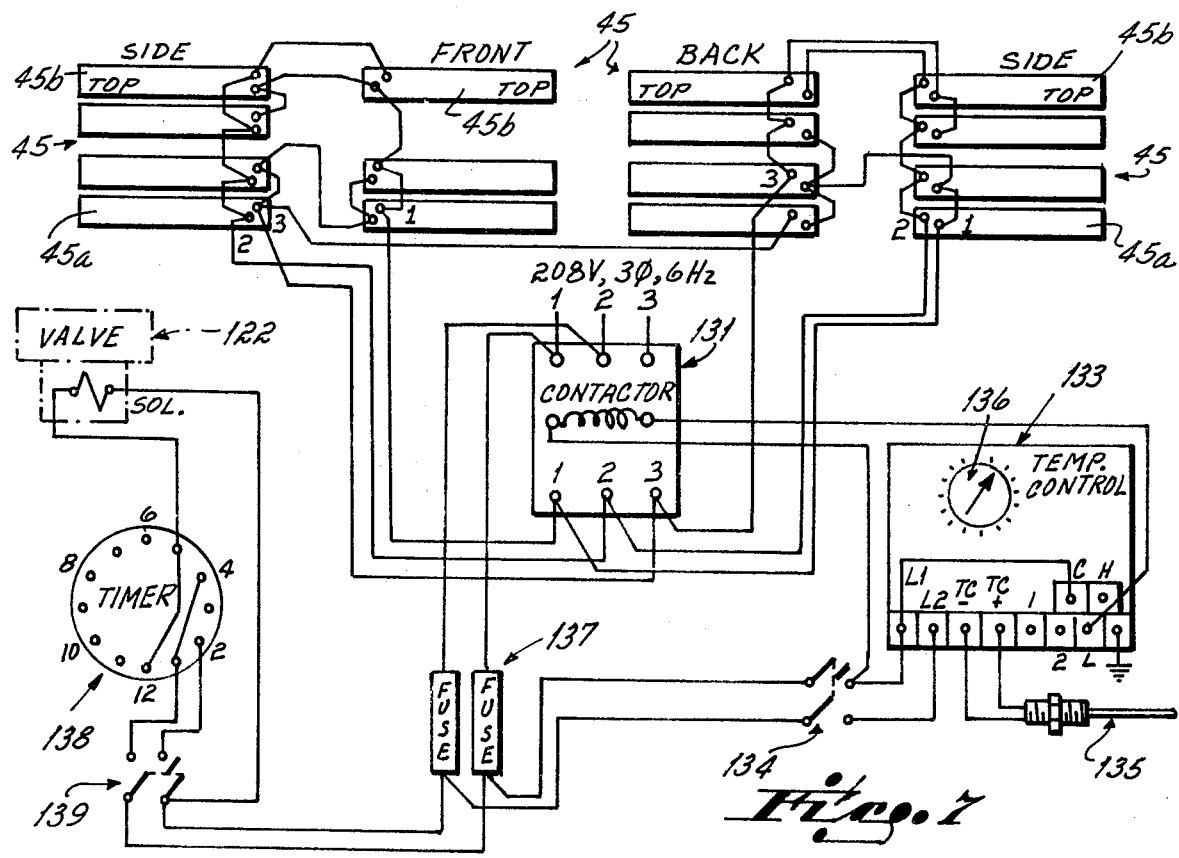
Fig. 7

PRESSURE COOKER

This invention relates to pressure cookers. More particularly, this invention relates to a pressure cooker specially structured for use in frying foods in oil, and cooking foods in water, under pressure.

Pressure cookers are, of course, very well known to the art. From a commercial use standpoint, one of the primary uses of pressure cookers is as pressure fryers. A pressure fryer provides a hot pot or tank of cooking oil which is adapted to cook chicken parts, seafood parts, french fries, or the like, in a commercial eating establishment, particularly, e.g., fast-food type restaurants. In use, the food is placed into the tank of cooking oil, a lid is positioned in sealing relation with the tank, and the oil then is maintained at a preferred temperature for a predetermined period of time while retaining the pressure in the tank at a preferred level. Food cooked in this manner is cooked quickly, and is quite tasteful.

There are two basic ways to heat the tank of cooking oil used in pressure fryers of the commercial restaurant type. The first way is to use gas heat and the second way is to use electrical heat. In the gas heated pressure fryer, a series of burners is provided beneath the tank so that the burners' flames impinge on the floor of the tank. This, of course, means that the tank's floor is the hottest part of the tank, i.e., is significnatly hotter than the tank's walls. During pressure cooking of certain foods, e.g., particularly breaded chicken parts or breaded seafoods such as shrimp, food particles fall off those food parts and gravitate toward the tank's floor. When the food particles hit the floor, and in the case of gas heated pressure fryers where the gas flames impinge on the tank's floor, those particles turn to carbon relatively quickly, thereby adversely contaminating the oil within the tank and requiring cooking oil changes relatively often. With gas heated commercial pressure fryers, this is a very significant problem in commercial use. With electrically heated pressure fryers, most widely used commercial fryer structures incorporate a serpentine electrical coil within the oil tank, i.e., the electrical coil is immersed within the cooking oil. In this type pressure fryer, the food particles, e.g., the breading of chicken parts, collects on the serpentine electrical coil, since it is immersed within the oil. This, of course, again quickly causes the food particles to turn to charcoal, and this, as with the gas heated pressure fryers, requires cooking oil batch changes within the tank on a relatively regular basis. Further, the serpentine electrical coils immersed in the cooking oil must be themselves cleaned periodically, and cleaning of such a coil is not an easy undertaking in a restaurant kitchen environment. In connection with electrically heated pressure fryers, it is also known to the prior art to provide resistance strip heaters on the outside of the fryer's tank. But as far as I am aware, attempted efforts in this direction have been unsuccessful commercially because of the difficulty in controlling the temperature of the cooking oil throughout the tank within the desired limited range necessary for cooking a food therein, i.e., the cooking oil pool in the tank tends to develop hot spots and cold spots, and also because of the relatively slow reaction time when changing the cooking oil temperature from one temperature range level to another temperature range level in response to increased or decreased heat emitted by the strip heaters on the exterior of the oil tank.

Therefore, it has been one objective of this invention to provide an improved pressure cooker, and, more particularly, an improved pressure fryer, in which the cooker's vessel or tank is provided with a novel and improved resistance heater structure mounted on the exterior of the tank in combination with a reflector and insulation structure carried between the tank's walls and the tank's housing, for effectively heating the cooking liquid (oil or water) within the tank to, and maintaining that cooking liquid at, a desired temperature level through multiple cooking cycles, and for permitting relatively quick temperature changes of that cooking liquid between cooking cycles, all the while maintaining a relatively cool zone of cooking liquid at the floor of the tank for substantial prevention of food particle carbonization with those particles that fall onto the tank's floor during each cooking cycle.

In accord with this one objective, and in preferred form, the pressure cooker of this invention incorporates a tank for the cooking liquid, whether oil or water, that is multi-sided, e.g., four sided, and that incorporates a plurality of strip type electrical resistance heaters on each and every side of that pot, the strip resistance heaters being positioned parallel to the tank walls' bottom edges and to one another, and the lowest resistance heater on each wall being mounted to the tank's wall substantially above that portion of the tank's floor where food particles dropping off food within the tank will most likely collect, thereby providing a relatively cool cooking liquid zone adjacent that floor. In combination with this heater structure, there is provided a heat reflector panel outboard of the resistance heaters and spaced therefrom on each side of the tank, the panels each defining a reflecting surface parallel to the tank's wall with which it is associated, and the bottom edge of each panel likewise being positioned above that portion of the tank's floor where food particles are most likely to collect. Each of the heat reflector panels is a rigid panel having a coefficient of heat reflectivity preferably between about 0.7 and about 1.0. The heat reflector panels cooperate with the resistance heaters on the tank walls' exterior surfaces to maintain a very hot air zone or blanket around the exterior periphery of the tank which tends to enhance control and homogeneity of the cooking liquid temperature within the tank, and the reaction time of that liquid to temperature changes established by the resistance heaters. Insulation is provided between the heat reflector panels and the side walls of the tank's housing to prevent the housing's side walls from becoming too hot, this insulation being retained in position through compression exerted thereon by virtue of the tank housing structure itself in cooperation with the rigid heat reflector panels.

It has been another objective of this invention to provide a pressure cooker with a novel cover and cover hold-down mechanism, that mechanism permitting the cover to be easily removable from its hold-down mechanism for cleaning purposes.

In accord with this object objective, a tank cover or lid is provided for the cooker's tank. The cover includes plural hooks adapted to interfit with plural hook supports provided on a hold-down bar pivotally connected to the cooker's housing, the hooks causing the cover to remain in interconnected relation with the hold-down bar as that bar is moved between open tank and close tank positions, but permitting the cover to be lifted off that hold-down bar simply by lifting same upwardly when the hold-down bar is positioned in the open tank position. The hold-down bar includes latch means for connecting it to the cooker housing at its non-pivoted end when in the closed position, and includes a hold-down device operable to close the cover into pressure sealed relation against the tank during use of the cooker.

Other objectives and advantages of this invention will be more apparent from the following detailed description taken in conjunction with the drawings in which:

FIG. 2 is a cross-sectional view taken along line 2—2 of FIG. 1;

FIG. 3 is a cross-sectional view taken along line 3—3 of FIG. 1;

FIG. 4 is an enlarged cross-sectional view illustrating encircled portion A of FIG. 1;

FIG. 5 is an enlarged cross-sectional view illustrating encircled portion B of FIG. 1;

FIG. 6 is an enlarged cross-sectional view illustrating encircled portion C of FIG. 1; and FIG. 7 is a circuit diagram illustrating the control circuit for the pressure cooker.

Figure 1:
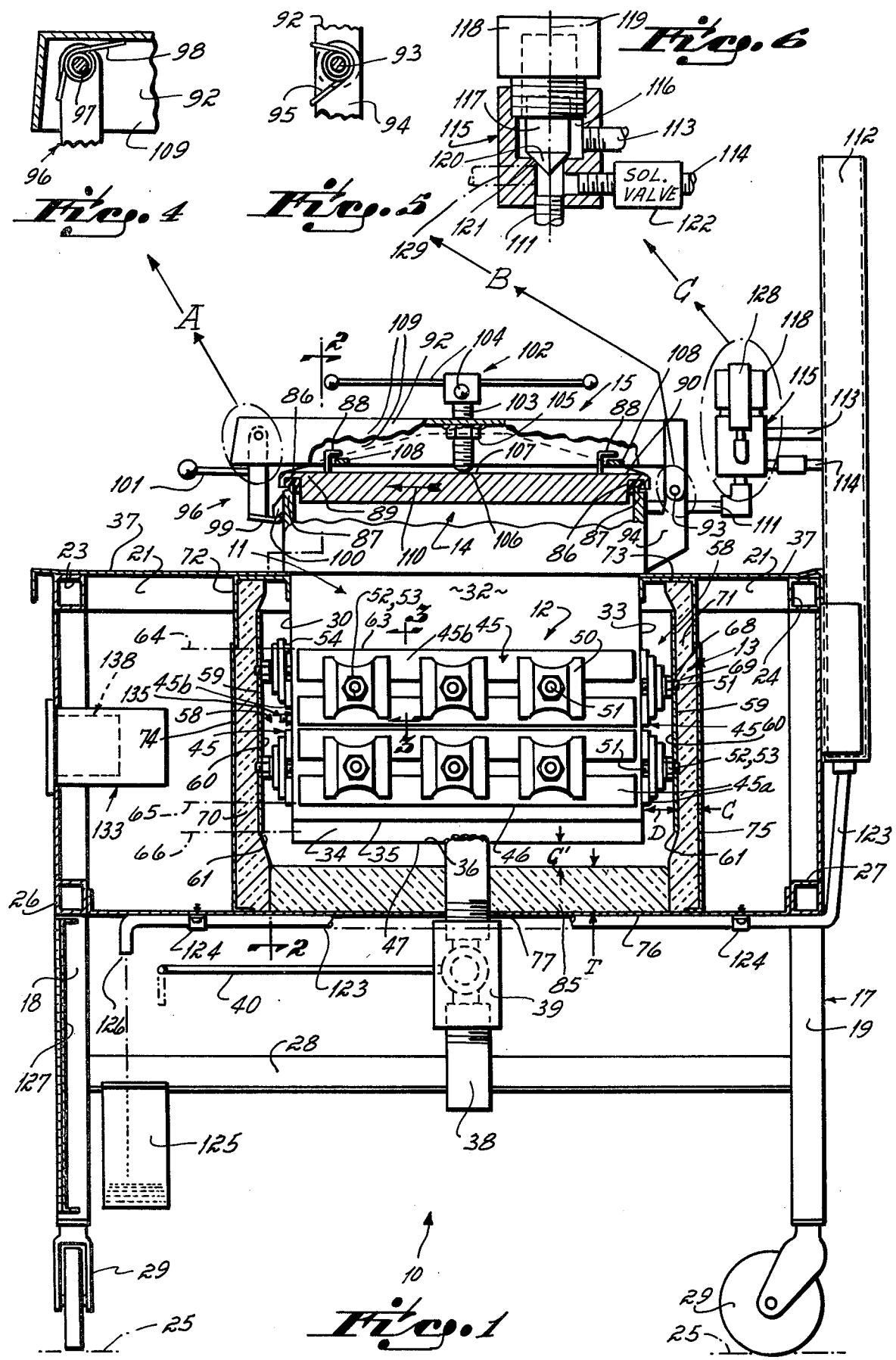
FIG. 1 is a cross-sectional side view illustrating a pressure cooker in accord with the principles of this invention.

The structure of a pressure cooker, e.g., pressure fryer 10, in accord with the principles of this invention is illustrated in FIGS. 1–6, and the control circuit for that fryer is illustrated in FIG. 7. The cooker 10 itself basically includes a cooking liquid tank 11 adapted to receive cooking oil or water, an electric resistance heater 12 structure, a heat reflector and insulation structure 13, a cover 14 and cover hold-down mechanism 15, a control circuit 16, and a frame 17.

The cooker's frame 17 is a mobile frame, and is basically comprised of corner posts 18–20, and upper 21–24, intermediate 26, 27 and lower 28 structural members. The upper structural members 21–24 provide a frame configuration about the four corner posts 18–20 (only three of which are shown). The intermediate structural members 26, 27 extend merely between the pairs of front corner posts 18, and rear corner posts 19, 20, respectively. The lower structural members 28 extend between pairs of front 18 and rear 19, 20 corner posts on each side of the frame 17. The corner posts are provided with rotatable casters 29 to make the frame 17 and, therefore, the entire fryer 10, mobile relative to ground 25.

The fryer's tank is a rectangular tank having front 30, side 31, 32 and rear 33 walls, and a floor 34. The tank's side walls 31, 32 are tack welded to upper structural members 21, 22 of the frame 17 for holding the tank 11 in position with that frame. Note particularly the tank's floor 34 is sloped downwardly from the bottom edges 35 of opposing side walls 31, 32 to define a trough 36 beneath those side walls as shown in FIG. 2. The tank's walls 30–33 all extend upwardly above the work surface panel 37 of the fryer 10 to cooperate with the cover 14 and cover hold-down mechanism 15 as explained in greater detail below. The tank 11 is provided with a drain line 38 that connects with the tank's floor 34 at the lower most point thereof, the drain line incorporating a gate valve 39 operable by valve handle 40 movable between a solid line closed position as shown in FIG. 1, and a phantom line open position for draining the tank of the cooking liquid, i.e., oil or water, therein when desired by the user.

The tank's heater structure 12 is particularly illustrated in FIGS. 1–3. As shown therein, the heater structure 12 incorporates electrical resistance heaters 45 of the strip type which ae positioned in spaced parallel relation one to another on each of the side walls 31, 32 and on each of the tank's front 30 and rear 33 walls. Note particularly on the side walls 31, 32 and rear 33 walls there are provided four strip heaters 45, and on the front wall 30 there are provided only three strip heaters as shown in FIG. 2. Note particularly that the bottom edge 46 of each lower most strip heater 45a on each of the walls 30-33 is spaced above the bottom edges 35 of the tank's side walls 31, 32. This creates a relatively cool zone for the cooking liquid, i.e., oil or water, within the tank's trough 36 adjacent the tank's outlet to drain line 38. This cool zone, therefore, is disposed beneath a phantom plane that includes all the lower heater elements' bottom edges 46. This is desirable in that food particles (not shown) which fall onto the floor 34 tend to migrate toward the center 47 of that floor since it is sloped downwardly relative to the side walls' bottom edges 35, and in this cool zone the food particles are less likely to turn quickly into charcoal, thereby prolonging the useful life of the cooking liquid, particularly if it is oil. A preferred strip heater 45 particularly useful with the cooker of this invention is a Type OT electrical resistance strip heater manufactured by Chromalox Co.

The clamp 50 structure by which the heaters 45 are held in operational relation with the walls 30–33 of the cooker's tank 11 is particularly illustrated in FIG. 3, and also in FIGS. 1 and 2. As shown in those figures, a series of threaded studs 51 is welded to the tank walls' outer surfaces between the parallel strip heaters 45 for each pair of strip heaters. An X-clamp 50 is sized to overlie an adjacent pair of strip heaters 45, and is held in clamping relation therewith by a washer 52 and nut 53 threaded on each threaded stud 51. For the tank's front wall 30, and since only three strip heater elements 45 are used, a spacer bar 54 is provided with the X-clamps 50 used on the uppermost strip heater element 45b for that front wall.

A heat reflector structure 13 is provided in combination with the resistance strip heaters 45 to establish an air blanket 58 around the exterior periphery of the tank's walls 30–33. The air blanket 58 is provided around the exterior periphery of the tank's walls 30–33 only, i.e., does not extend beneath the tank's floor 34 or substantially beneath the side wall's bottom edges 35, and the resistance heaters 45 are positioned with that air space 58. The air space 58 is defined by four heat reflective panels 59 spaced outwardly an identical distance D from each of the respective tank walls 30–33. Note particularly that the reflective face 60 of each of these panels 59 is parallel to its associated tank wall 30–33, and that the bottom edges 61 of the heat reflector panels 59 are in a phantom plane 66 located above the lowermost point 47 of the tank's troughed floor 34. Note also that the heat reflector panels 59 extend beyond the phantom plane 64 that includes top edges 63 of the upper heat electric resistance heater elements 45b on the tank's walls 31-33, and below the phantom plane 65 that includes bottom edges 46 of the lower-most resistance heater elements 45a on each of the tank's walls 30–33. Preferably, the heat reflector panels each have a heat reflection coefficient of between about 0.7 and about 1.0. A preferred heat reflector panel is fabricated of a mineral fiber cement sheet having a heat reflection coefficient of 0.93 and sold under the Flexboard trademark by Johns-Manville Corp., Denver, Colorado. The heat reflector panels 59 are rigid, and each provided with a series of bore or holes 68 therethrough that are positioned to cooperate with those portions 69 of the threaded studs 51 which extend outwardly beyond the nuts 53 used to hold the X-clamps 50 and heater elements 45 in place on the tank's walls 30-33. In other words, the heater reflector panels 59 are hung or mounted on studs 51, too, and this stud 51 structure cooperates to hold the resistance heater elements 45 and the reflector elements 59 in position relative to the tank's walls 30-33. The pressure of heat reflector panels 59, in combination with the strip heater elements 45 on the exterior surface of the tank 11, cooperates to tend to maintain the heat level of the cooking oil or water within the tank during multiple cooking cycles within minimum limits, i.e., without undue temperature fluctuations, and with minimum variation temperature throughout the liquid within the tank, i.e., with minimum hot spots. Further, this structure tends to enhance the response time when increasing or decreasing the operational temperature level within the tank's liquid without substantial over-running (on the high side if the temperature is being increased, or on the low side if the temperature is being decreased), the desired new temperature level.

With regard to the insulation structure 13 associated with the tank 11, and as to the tank's front 30 and rear 33 walls, note as shown in FIG. 1 that insulation batting 70, 71 is provided exteriorly of the heat reflector panels 59. This insulation batting 70, 71 is held in position by means of tank support angles 72, 73 which are tack welded to the tank's front 30 and rear 33 walls and to the cooker's work panel 37. Tank housing walls 74, 75 are tack welded to the support angles 72, 73, and to an intermediate floor 76. The intermediate floor 76 is tack welded to front 26 and rear 27 intermediate frame members, and includes a hole 77 through which the tank drain line 38 passes. As is illustrated in FIG. 1, the tank housing's front 74 and rear 75 walls are positioned a clearance distance C from the heat reflector panels 59 which is less than the normal uncompressed thickness T of the flexible or resilient insulation batting 70, 71, thereby holding same in place. The reflector elements 59 associated with the tank's side walls 31, 32 similarly cooperates with the tank's side wall insulation batting 80, 81, see FIG. 2. As to this latter insulation 80, 81 however, the cooker housing's side walls 82, 83 cooperate with flanges 84 depending from the side edges of the cooker's work surface 37 to retain the insulation batting 80, 81 in the compressed configuration. Uncompressed insulation batting 85 is provided on the sub-floor 76 immediately beneath the tank 11, but in spaced relation thereto as shown by clearance C'. Preferably the insulation used has a thermal conductivity at 300° F. of between about 0 and about 0.5. A preferred insulation is a mineral wool insulation having a thermal conductivity of 0.34 at 300° F. and marketed by the 48 Insulations Co., Alliance, Ohio. The side walls 82, 83 for the tank's housing, therefore, also constitute the side walls of the cooker's housing.

The cover 14 and cover hold-down mechanism 15 for the cooker 10 is particularly shown in FIGS. 1, 2, 4 and 5. The cover 14 is in the nature of a closed plate having a gasket 86 extending around the periphery thereof, the cover and gasket being adapted to cooperate with the top edge 87 of the tank's walls 30-33 to close the tank 11 to atmosphere when in the closed position shown in the figures. Note particularly that the cover 14 has two brackets 88 adjacent the front 89 and rear 90 edges thereof, the brackets being right angled in configuration, and facing toward the rear of the cooker. These cover brackets 88 cooperate with the hold-down mechanism 15 in a manner to be later described. The hold-down mechanism 15 itself includes a hold-down bar 92 pivotally mounted by pin 93 to bracket 94 fixed to that portion of the tank's rear wall 33 that extends above the work surface 37 of the cooker 10. The hold-down bar 92 is spring 95 loaded so that it tends to spring open to a cover open position (not shown) when not holding the cover 14 in sealed relation with the tank 11. The non-pivoted end of the hold-down bar carries a latch 96 pivotally connected thereto on pin 97, the latch being normally spring 98 loaded closed. The latch 96 includes a latch finger 99 at its free end adapted to cooperate with strike plate 100 mounted to the top portion of the tank's front wall 30. A handle 101 on the latch is provided for dis-engaging the latch finger 99 from the strike plate 100 when the hold-down bar 92 is in the pressure or cover close position shown in the figures. A pressure wheel 102 comprised of threaded shaft 103 and radial spoke handles 104 is threadedly connected to the hold-down bar 92 by force nut 105 welded to the underside of that hold-down bar. The threaded shaft 103 includes a bearing surface 106 at one end adapted to contact the top surface 107 of the cover 14, but is not connected therewith. When the cover 14 and hold-down bar 92 are in the closure position shown in FIGS. 1 and 2, as the pressure wheel 102 is rotated bearing end 106 of the bearing shaft 103 forces the cover into pressurized sealing relation with the tank 11. Such is accomplished, of course, after the spring 95 loaded open hold-down bar 92 has been latched into closure relation with the tank 11 by the spring 98 loaded manual latch 96. When the cooker's cover 14 is to be opened, the bearing pressure on the cover's top surface 107 is released by rotating the threaded shaft 103 in the opposite direction through use of handle 102, and the latch 96 is released, thereby allowing the cover to spring open due to spring 95. As the cover 14 springs open, the cover's brackets 88 inter-engage restraint bars 108 fixed between side walls 109 of the hold-down bar 92, thereby drawing the cover upwardly with it. However, and because the cover's brackets 88 are right angle brackets, when the cover 15 is open the cover may be easily removed from engaged relation with the hold-down bar 92 simply by moving same in the direction shown by direction arrow 110 in FIG. 1, i.e., toward the latch 96 end, and away from the pivot 93 end, of the hold-down bar 92. This structure, therefore, permits the cover 14 to be easily removed from the cooker 10 for a thorough cleaning, and to be easily reconnected therewith simply by inter-engaging the cover's brackets with the hold-down bar's restraint seats 108 in a direction opposite to that shown by the direction arrow 110.

The piping system associated with the pressure cooker 10 is particularly illustrated in FIGS. 1, 2 and 6. The piping system includes the tank drain line 38 controlled by gate valve 39 as previously mentioned. The piping system also includes pressure relief line 111 connected with open stack 112. The pressure relief line 111 is connected with the top portion of the tank 11 at one end, and at the other end is connected with a safety line 113 and a solenoid line 114 through coupling 115. The coupling 115 includes a chamber 116 adapted to receive weight 117, the weight being retained in the chamber through closed cap 118 but being vertically reciprocable within that chamber on center line 119. The weight 118 is provided with a pointed end 120 adapted to sit on seat 121, pressure from the tank's interior lifting the weight off its seat so as to relieve that pressure through safety line 113 into the stack 112 only when the pressure is great enough to lift the weight off the seat. Of course, the pressure release valve provided by weight 118 and valve seat 120 is normally closed due to gravity, thereby constituting a safety relief valve. A solenoid valve 122, normally spring loaded opened as discussed in connection with the electric circuit below, is positioned in the solenoid line 114. When the control circuit is energized, i.e., when the cooker is in a cooking cycle, the circuit closes the solenoid valve 122 so that no pressure escapes from the tank's interior. In this operational mode, of course, the safety relief valve 120, 121 provides for escape of pressure, if the pressure in the tank 11 becomes excessive, through the safety line 113 into the open stack 112. When a cooking cycle is completed, the control circuit allows solenoid valve 122 to open so that the built-up pressure within the tank 11 can escape through line 114 into the open stack before the cover 14 is opened by the cooker's user. The stack 112 itself is in the nature of an exhaust stack closed at the bottom end, and adapted to cooperate with duct work (not shown) to be connected at its top end for exhaust to atmosphere. A drain line 123 is connected with the bottom end of the open stack 112, the drain line extending beneath the interior floor 76 of the cooker as shown in FIG. 1. The drain line 123 is connected to the underside of that interior floor by brackets 124. A drip tank 125 is positioned between angle supports 28 connected to the cooker frame's corner posts 18, 19 on each side thereof for receiving whatever condensate drips out of that dip line's exhaust end 126 during use of the cooker itself. A door 127 is hingedly connected to the frame's front corner post 18 by hinges (not shown) for access to the drip tank 125, and to actuator arm 40 for the tank drain's valve 39. A pressure gauge 128 is also connected to relief line 111 through coupling 115 for providing visual pressure readings to the cooker's operator, that pressure gauge being continuously connected to the pressure relief line by port 129.

The contained oil in the deep fryer of the invention is heated by resistive heating elements mounted to the exterior of the oil tank as described earlier. Each of the resistive heating elements is preferably a Catalog No. OT-1801 Chromolox 240 volt, 1000 watt strip heater, available from the Edwin L. Wiegand Company of Pittsburgh, Pennsylvania. The strip heaters are desirably thermostatically controlled for maintaining the temperature of the oil at a selectable temperature through a timed cooking cycle.

An electrical circuit for thermostatically controlling the resistive heating elements which heat the oil tank is shown in FIG. 7. The control circuit, designated generally by the reference numeral 16 preferably includes a contactor 131 for connecting a 208 volt, 60 Hz. three-phase power source to strip heaters 45 under control of a thermostatic control 133. Contactor 131, for example, may be an Allen Bradley Company Catalog No. 702L-COH93, Series K, 208 volt, 60 Hz. three-phase contactor. When the coil of contactor 131 is energized by thermostatic control 133, each strip heater is connected in parallel across two phases of the 208 volt, 60 Hz. three-phase power source by contactor 131.

Thermostatic control 133 is preferably a Model 550 Thermocouple Sensing Temperature Controller, Catalog No. 55-001140-302, available from Fenwal, Inc. of Ashland, Massachusetts with a Fenwal Type "J" Thermocouple. Thermostatic control 133 is energized by a double-pole, single throw switch 134 which connects the thermostatic control through a fuse block 137 having two fuses, such as ten amp fuses, across two phases of the 208 volt, 60 Hz. three-phase power source. Thermocouple 135 is mounted through the wall of the oil tank into the oil for sensing the oil temperature, see FIGS. 2 and 7. When the oil temperature is less than the selected temperature set by a dial 136 on thermostatic control 133, the thermostatic control energizes the coil of contactor 131 for connecting the 208 volt, 60 Hz., three-phase power source to the strip heaters 45 for heating the oil in the tank. When, however, the oil temperature reaches the temperature set by dial 136, thermostatic control 133 de-energizes the coil of contactor 131 for disconnecting the strip heaters from the power source. Also, at any time, switch 134 may be acuated to de-energize thermostatic control 133 for disconnecting the strip heaters from the power source.

In order to provide a timed cooking cycle at the temperature set by dial 136 of thermostatic control 133, a timer 138, such as a Catalog No. HP55B6 CYCLE-FLEX) Reset Timer available from the Eagle Signal Industrial Controls Division of Gulf & Western Manufacturing Company of Davenport, Iowa is provided for setting the time for a cooking cycle. Timer 138 is preferably connected by a double pole, single throw switch 139 through the fuses in fuse block 137 across two phases of the 208 volt, 60 Hz. three-phase power source for energizing the timer motor. Timer 138 is provided with a set of normally closed contacts. The normally closed contacts of timer 138 are preferably connected in series with the coil of a normally open valve 122 which has an inlet connected into the oil tank of the deep fryer. Solenoid valve 122, for example, is preferably an ASCO Catalog No. 8267B23 208 volt, 60 Hz. solenoid valve. When timer 138 is energized during a cooking cycle, the normally closed contacts provided in the timer are closed as that the coil of solenoid valve 122 is energized for closing the solenoid valve to provide a seal up to a predetermined pressure, for example, 15 pounds per square inch, to the oil tank. If at any time during the cooking cycle the pressure inside the oil tank exceeds the predetermined pressure, the pressure forces open solenoid valve 122 for providing pressure relief to avoid an unsafe pressure build-up within the oil tank during the cooking cycle. When a timed cooking cycle is completed, the normally closed contacts provided in timer 138 are opened so that the coil of solenoid valve 122 is de-energized for opening the solenoid valve to release any pressure build-up in the oil tank prior to the time that the cover of the deep fryer is removed.

Having described in detail the preferred embodiment of my invention, what I desire to claim and protect by Letters Patent is:

1. A pressure cooker comprising
    a tank positioned within a housing, said tank having plural walls and a floor, the floor of said tank sloping downwardly toward the center thereof from the bottom edges of at least two of said walls,
    a cover receivable in sealing relation with the top of said tank,
    a plurality of generally linear strip electrical resistance heater elements mounted to said plural walls on the exterior surfaces thereof, said strip heater elements being spaced one from the other and being disposed generally parallel one to the other, said heater elements being disposed generally parallel to the bottom edges of said at least two walls, and the lowest of said heater elements on each of said at least two walls being spaced above the bottom edge of said wall from which said floor slopes downwardly, a heat reflector panel associated with each of said plural walls, said panel having a coefficient of heat reflectivity between about 0.7 and about 1.0, said heat reflector panels being spaced from said tank walls so as to define an air space between said panels and said tank walls around the periphery of said tank, and said plural walls, said heater elements and said reflector panels functioning to define a hot air blanket for each of said plural walls when said cooker is in use to enhance control and homogeneity of the cooking temperature within the tank as established by said heater elements, an electric circuit that includes said heater elements, said electric circuit cooperating with said heater elements for applying heat to said tank, and insulation interposed between said heat reflector panels and said housing.

2. A pressure cooker as set forth in claim 1, said cooker further comprising clamp structure for each pair of heater elements, said clamp structure comprising a clamp of generally X-shaped configuration, the ends of said clamp being adapted to cooperate with a pair of spaced heater elements for retaining same in pressure relation with a wall of said tank, a stud fixed to and extending outwardly from a tank wall, said clamp being compressed against said heater elements through use of said stud, and each of said heat reflector panels including structure defining a plurality of holes, each of said holes being adapted to receive one of said studs, said panels being held in structural relation with said tank's walls by said studs passing through said panels' holes.

3. A pressure cooker as set forth in claim 2, said housing being sized so that said insulation interposed between said heat reflector panels and the walls of said housing are held in compressive relation against said heat reflector panels by said housing's walls, thereby also retaining those heat reflector panels in connected relation with said studs.

* * * * *